US012695234B2

(12) United States Patent
Zou

(10) Patent No.: US 12,695,234 B2
(45) Date of Patent: Jul. 28, 2026

(54) ELECTRICAL CONNECTOR

(71) Applicant: Xinjiang Zou, Meizhou City (CN)

(72) Inventor: Xinjiang Zou, Meizhou City (CN)

( * ) Notice: Subject to any disclaimer, the term of this patent is extended or adjusted under 35 U.S.C. 154(b) by 288 days.

(21) Appl. No.: 18/402,856

(22) Filed: Jan. 3, 2024

(65) Prior Publication Data

US 2025/0158314 A1 May 15, 2025

(30) Foreign Application Priority Data

Nov. 14, 2023 (CN) ......................... 202323075510.9

(51) Int. Cl.
*H01R 13/502* (2006.01)
*H01R 13/05* (2006.01)
*H01R 13/11* (2006.01)
*H01R 13/24* (2006.01)
*H01R 13/629* (2006.01)

(52) U.S. Cl.
CPC ........... *H01R 13/502* (2013.01); *H01R 13/05* (2013.01); *H01R 13/11* (2013.01); *H01R 13/2407* (2013.01); *H01R 13/629* (2013.01)

(58) Field of Classification Search
CPC ...... H01R 13/502; H01R 13/05; H01R 13/11; H01R 13/2407; H01R 13/629
USPC ................................ 439/638, 295, 289, 290
See application file for complete search history.

(56) References Cited

U.S. PATENT DOCUMENTS 4,943,240 A * 7/1990 Karlsson ............... B60R 16/027 439/15
7,338,316 B2 * 3/2008 Blickle ................ H01Q 1/3275 439/546
7,976,326 B2 * 7/2011 Stoner .................. H01R 13/193 439/74
9,917,389 B2 * 3/2018 Markefka .............. H01R 13/05
2005/0014409 A1 * 1/2005 Yang ...................... H01R 24/84 439/290
2010/0029116 A1 * 2/2010 Simon .................... H01R 13/28 439/290

* cited by examiner

*Primary Examiner* — Gary F Paumen

(57) ABSTRACT

The present application relates to an electrical connector, comprising: a male annular socket and a female annular socket, a plug with a first conductor of the male annular socket is mountably and dismountably inserted in an inserting slot with a second conductor of the female annular socket, and when the plug is inserted in the inserting slot, the first conductor is electrically connected to the second conductor, and the male annular socket is fixedly connected to the female annular socket.

14 Claims, 10 Drawing Sheets

ELECTRICAL CONNECTOR

CROSS-REFERENCE TO RELATED APPLICATIONS

The application claims priority of Chinese patent application NO. 202323075510.9, filed on 2023 Nov. 14, which is incorporated herein by reference in its entireties.

TECHNICAL FIELD

The present invention relates to the technical field of connector, and in particular, to a electrical connector.

BACKGROUND

The electrical connector is a device used for fixing a lamp to a position and making the lamp contacts connected to the power source, reasonable use of the electrical connector helps to regularize wiring and extend the electrical line, for some objects that require rendering of light, such as Christmas trees, which will be mounted with a lot of LED parts for decoration, if using traditional wiring it will cause trouble in wiring, and electrical lines and LED parts are mostly in fixed state, when it is necessary to increase the number of LED parts additional wiring is needed, which is difficult to extend, and is not flexible to design according to the requirements which affects the overall appearance of the Christmas tree. For these reasons, a connector for Christmas trees has been developed on the market, including a male annular socket and a female annular socket, the male socket and the female socket are both configured to surround the trunk or the branch of the Christmas tree and are connected to each other for electrical connection, and the male socket and the female socket are respectively provided with a power cord so that the male socket can be electrically connected to the total power source (or LED light emitting parts) and the LED parts (or the total power source) so that it is flexible for configuration of a number of the above-mentioned connectors for the Christmas tree. However, the applicant found that the structure of the electrical connection between the male socket and the female socket, which is only accomplished via a piece of metal on the male socket and a piece of metal on the female socket to contact for electrical connection, is simple, after a long time of use the electrical connection between the two metals is easy to become poor contact and unstable, causing the LED light-emitting parts can not light up, and as the number of connectors mounted on the Christmas tree is also relatively large, it is very difficult to troubleshoot and solve the problem of poor contact, for these reasons, the applicant concluded that an electrical connector which reinforces the structure of the electrical connection is necessary for a good electrical connection to prevent the LED light-emitting parts from being unable to light up and to avoid subsequent difficulties in troubleshooting and solving problems.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an electrical connector is provided, comprising: a male annular socket and a female annular socket, a plug with a first conductor of the male annular socket is mountably and dismountably inserted in an inserting slot with a second conductor of the female annular socket, and when the plug is inserted in the inserting slot, the first conductor is electrically connected to the second conductor, and the male annular socket is fixedly connected to the female annular socket.

In another aspect, an electrical connector is provided, comprising: a male annular socket and a female annular socket, a plug of the male annular socket is mountably and dismountably connected to an inserting slot of the female annular socket, the male annular socket has a first conductor and the female annular socket has a second conductor, and when the plug is inserted in the inserting slot, the first conductor is electrically connected to the second conductor, and the male annular socket is fixedly connected to the female annular socket.

In another aspect, an electrical connector is provided, comprising: a male annular socket and a female annular socket, a plug with a first conductor of the male annular socket is selectively inserted in an inserting slot with a second conductor of the female annular socket, and when the plug is inserted in the slot, the first conductor is in elastic contact with the second conductor to make the first conductor be electrically connected to the second conductor, and the male annular is clamped to the female annular socket.

The above aspects or examples and advantages, as well as other aspects or examples and advantages, will become apparent from the ensuing description and accompanying drawings.

BRIEF DESCRIPTION OF THE DRAWINGS

The drawings of the specification that form a part of the present application, are used to provide a further understanding of present the invention. Schematic embodiments and their descriptions of the present invention are used to explain the invention and do not constitute an improper limitation of the present invention. In the drawings.

DESCRIPTION OF REFERENCE SIGNS

Figure 1:
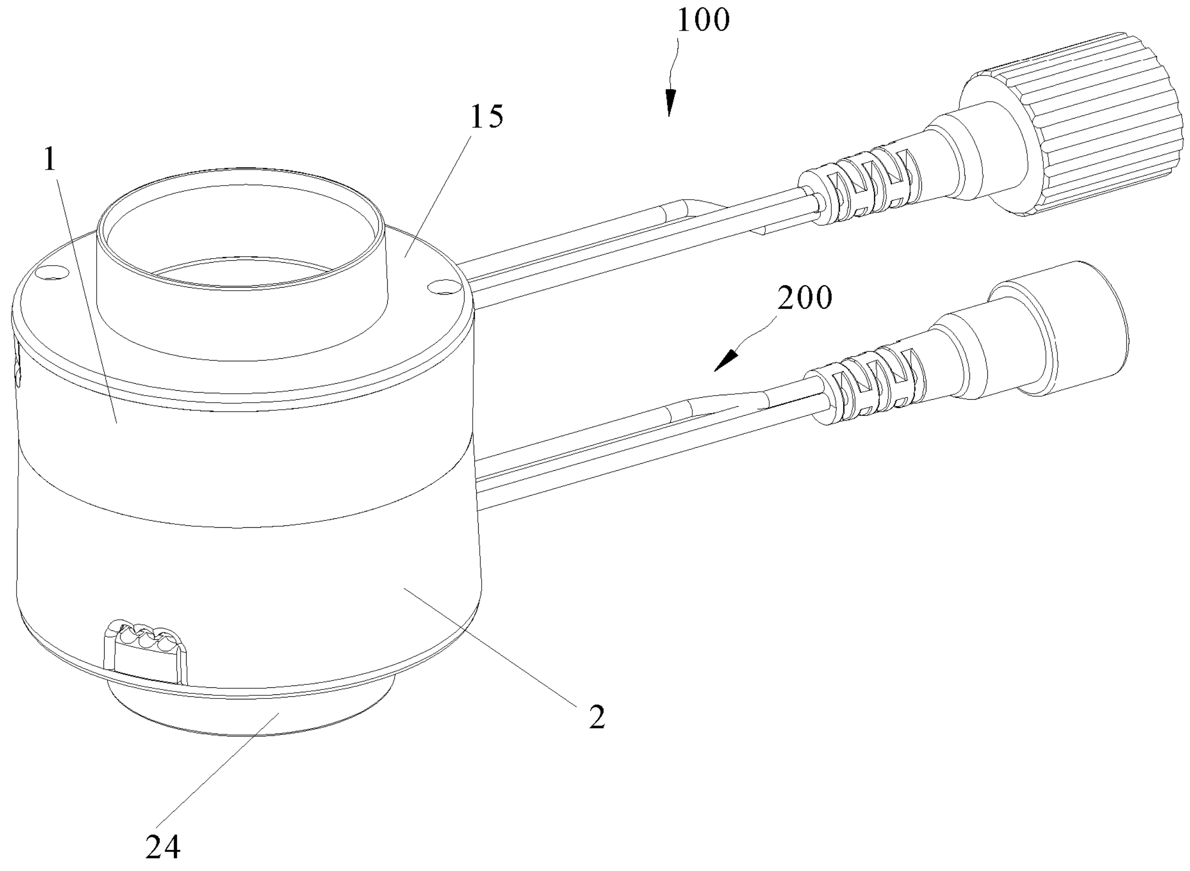
FIG. 1 shows a schematic view of an electrical connector according to an embodiment of the present application.

100—first power cord; 1—male annular socket; 2—female annular socket; 11—first conductor; 111—concave portion; 112—hook portion; 113—inclined surface; 12—plug; 121—first slot; 122—side opening of the plug; 123—convex portion; 124—elastic portion; 13—first wire groove; 14—passage; 15—first cap; 16—first wire hole; 17—positioning column; 200—second power cord; 21—second conductor; 211—substrate; 212—contact part; 213—limiting slot; 22—inserting slot; 221—second slot; 222—limiting portion; 223—side opening of the inserting slot; 23—second wire groove; 24—second cap; 25—second wire hole; and 26—positioning hole.

DETAILED DESCRIPTION OF THE EMBODIMENTS

The present invention will be described in detail below with reference to the drawings and in combination with embodiments. Various examples are provided by way of interpretation of the present invention rather than limiting the present invention. In fact, those skilled in the art will know that modifications and variations can be made to the present invention without departing from the scope or spirit of the present invention. For example, features shown or described as part of one embodiment may be used in another embodiment to generate another embodiment. It is therefore desirable that the present invention includes such modifications and variations that fall within the scope of the appended claims and their equivalents.

In the description of the present invention, the terms "longitudinal", "latitudinal", "up", "down", "front", "rear", "left", "right", "vertical", "horizontal", "top", "bottom", etc. indicate the orientation or positional relationship based on the drawings, which is only for the convenience of describing the present invention rather than requiring the present invention to be constructed and operated in a specific orientation, Therefore, it cannot be understood as a limitation of the present invention. The terms "connected", "connection" and "configure" used in the present invention should be understood in a broad sense, for example, it can be a fixed connection or a detachable connection; it can be a direct connection or an indirect connection through an intermediate part; it can be a wired electrical connection, a radio connection, or a wireless communication signal connection. For those skilled in the art, the specific meaning of the above terms can be understood according to the specific situation.

One or more examples of the present invention are shown in the drawings. The detailed description uses numerals and letter markers to refer to features in the drawings. Similar or like numerals in the drawings and descriptions have been used to refer to similar or like parts of the present invention. As used herein, the terms "first", "second", and "third" are used interchangeably to distinguish one component from another and are not intended to indicate the location or importance of individual components.

One embodiment provides an electrical connector.

Figure 2:
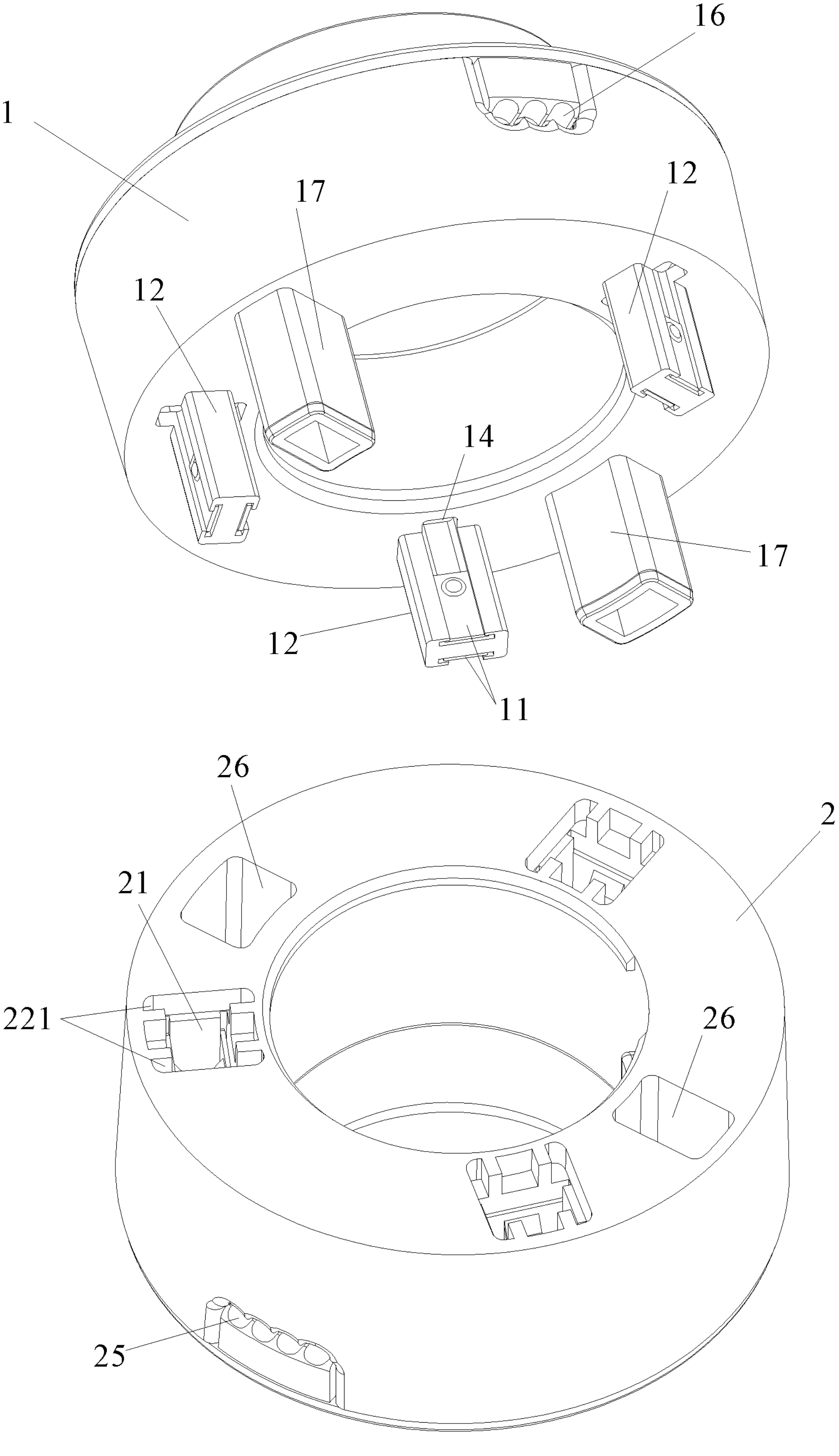
FIG. 2 shows a schematic view of a male annular socket and of a female annular socket according to an embodiment of the present application.
Figure 3:
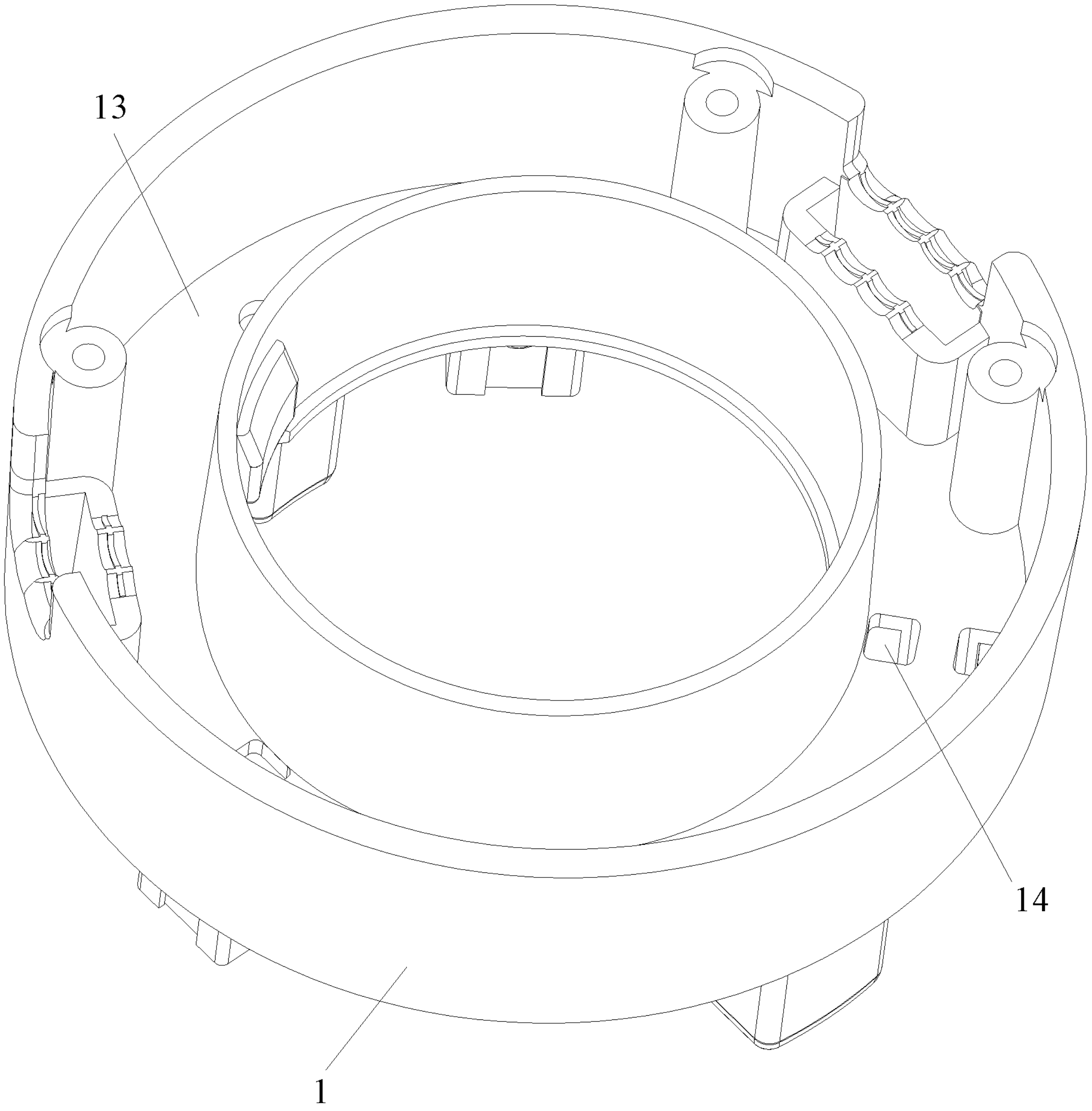
FIG. 3 shows a perspective view of a male annular socket at a first angle according to an embodiment of the present application.
Figure 4:
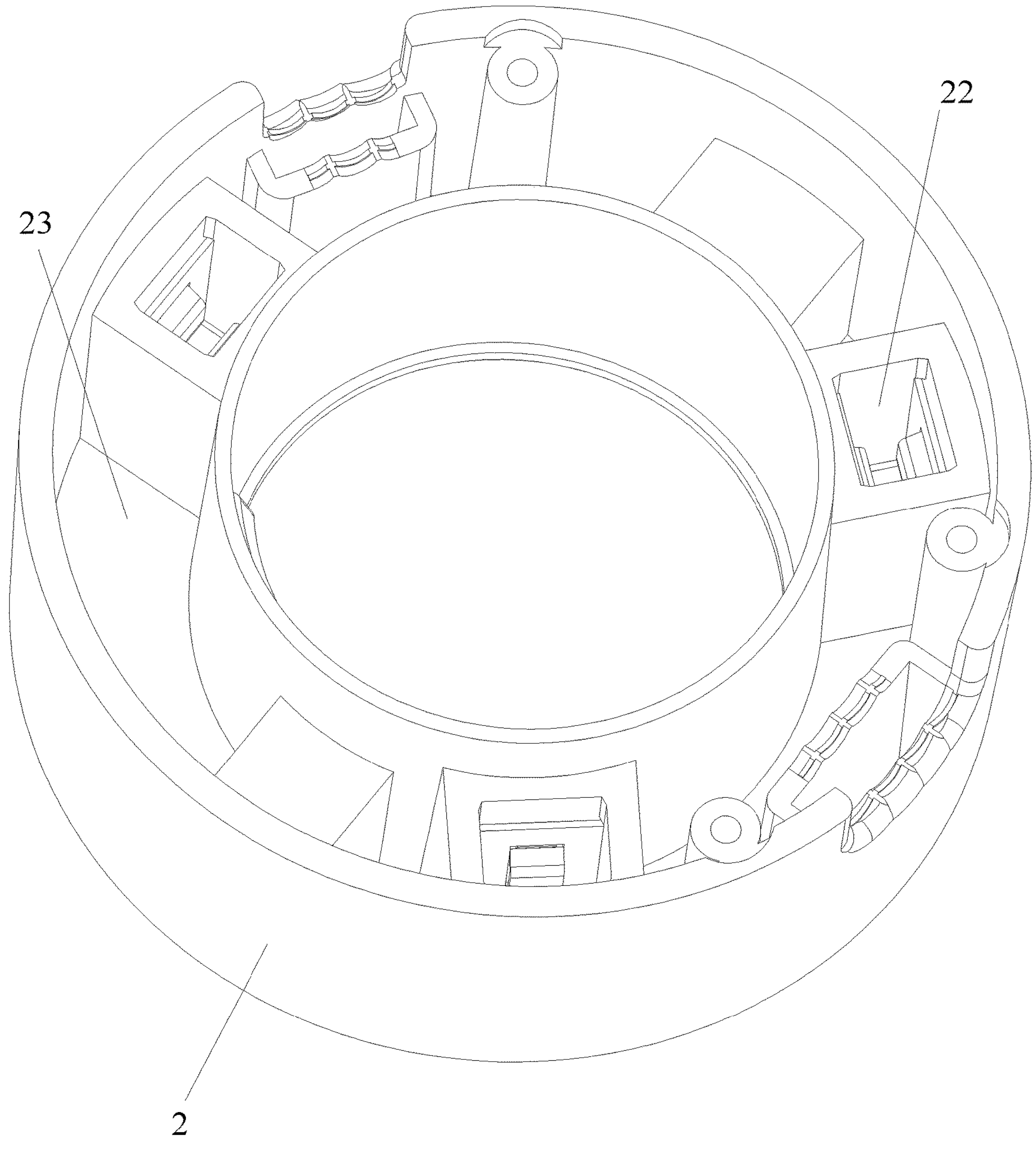
FIG. 4 shows a perspective view of a female annular socket at the first angle according to an embodiment of the present application.
Figure 5:
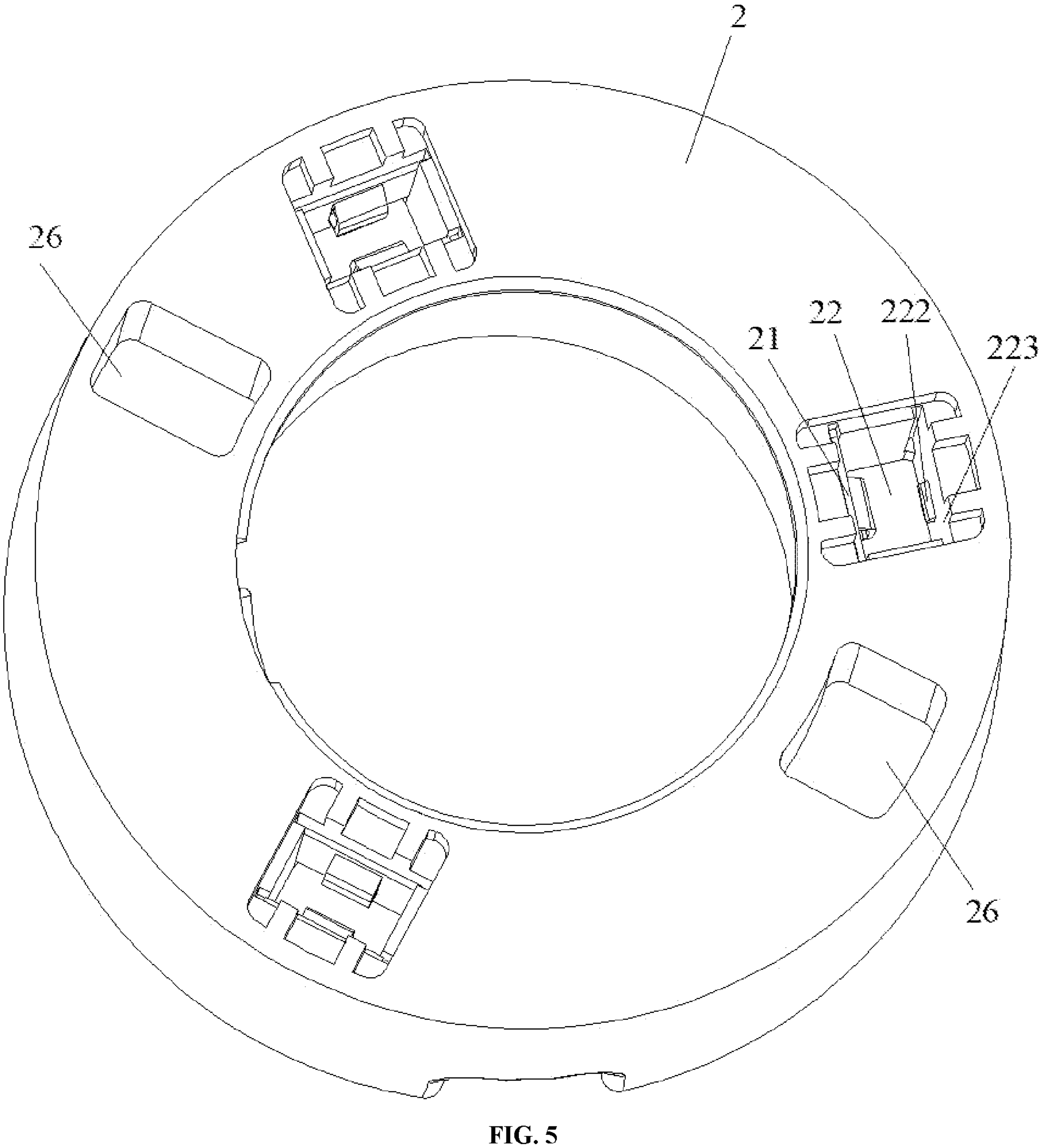
FIG. 5 shows a perspective view of a female annular socket at a second angle according to an embodiment of the present application.
Figure 6:
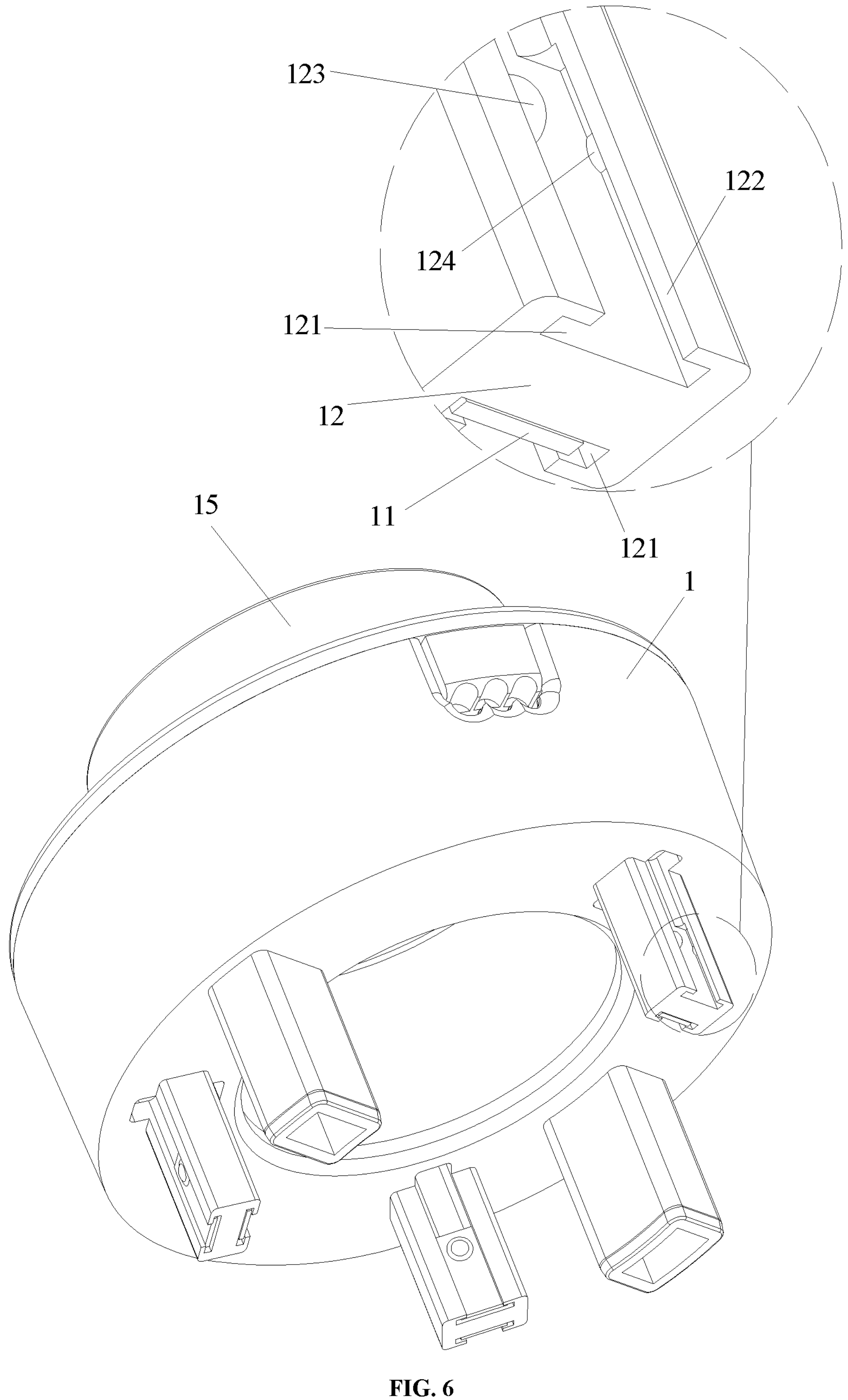
FIG. 6 shows a perspective view of a male annular socket at the second angle according to an embodiment of the present application.
Figure 7:
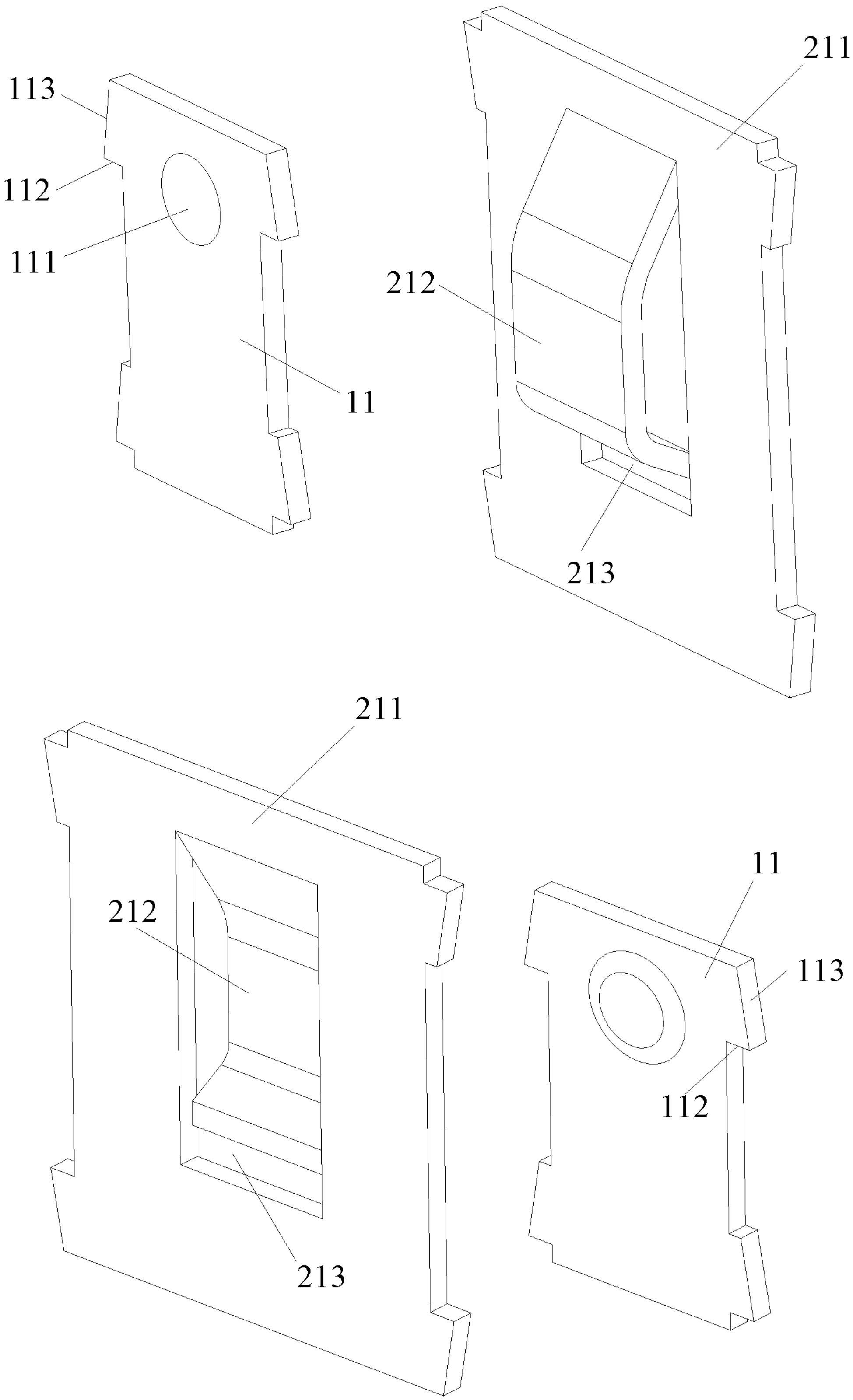
FIG. 7 shows a schematic view of a first conductor and of a second conductor socket according to an embodiment of the present application.
Figure 8:
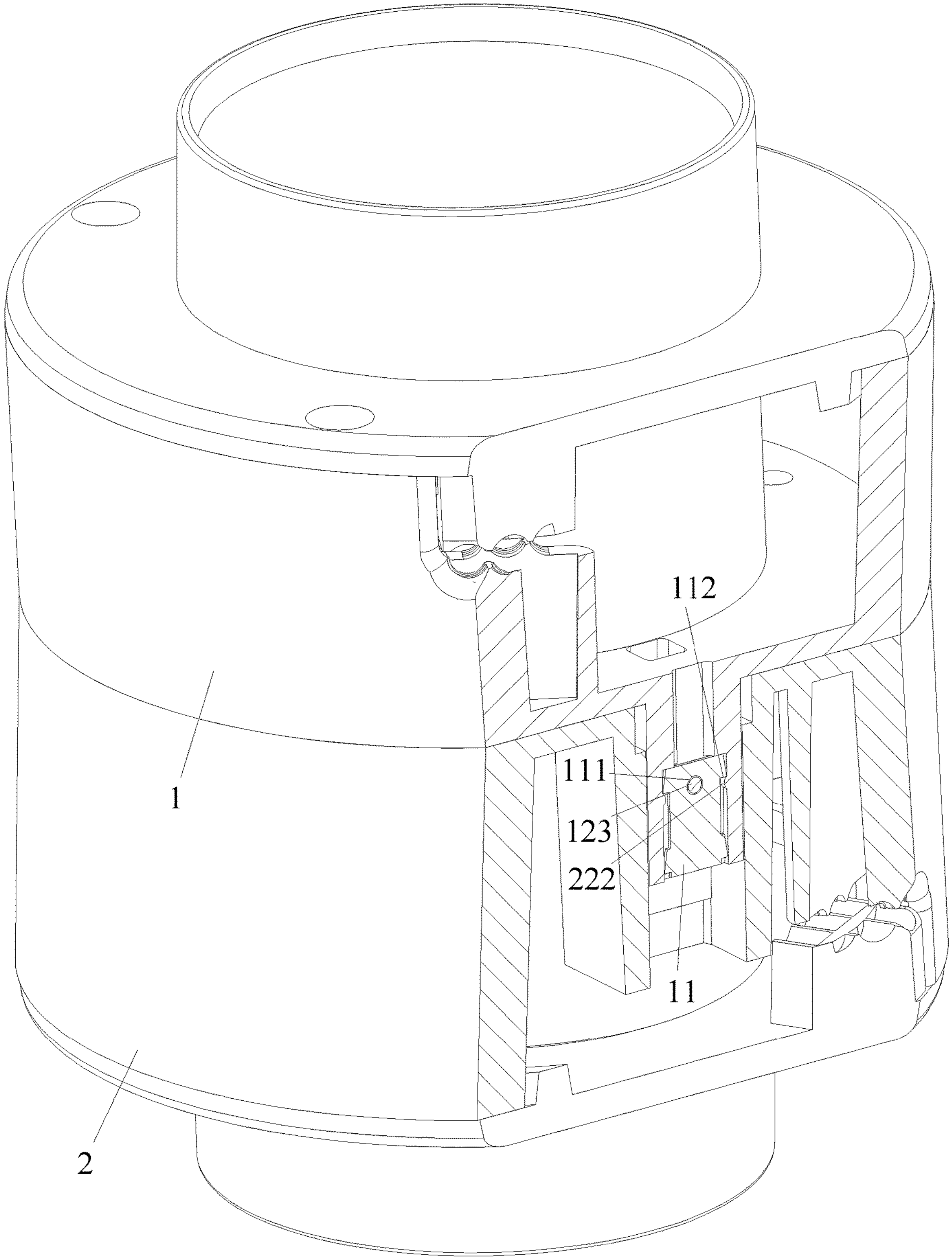
FIG. 8 shows a partial cross-sectional view of an electrical connector according to an embodiment of the present application, illustrating the engagement between a first conductor and a second conductor.
Figure 9:
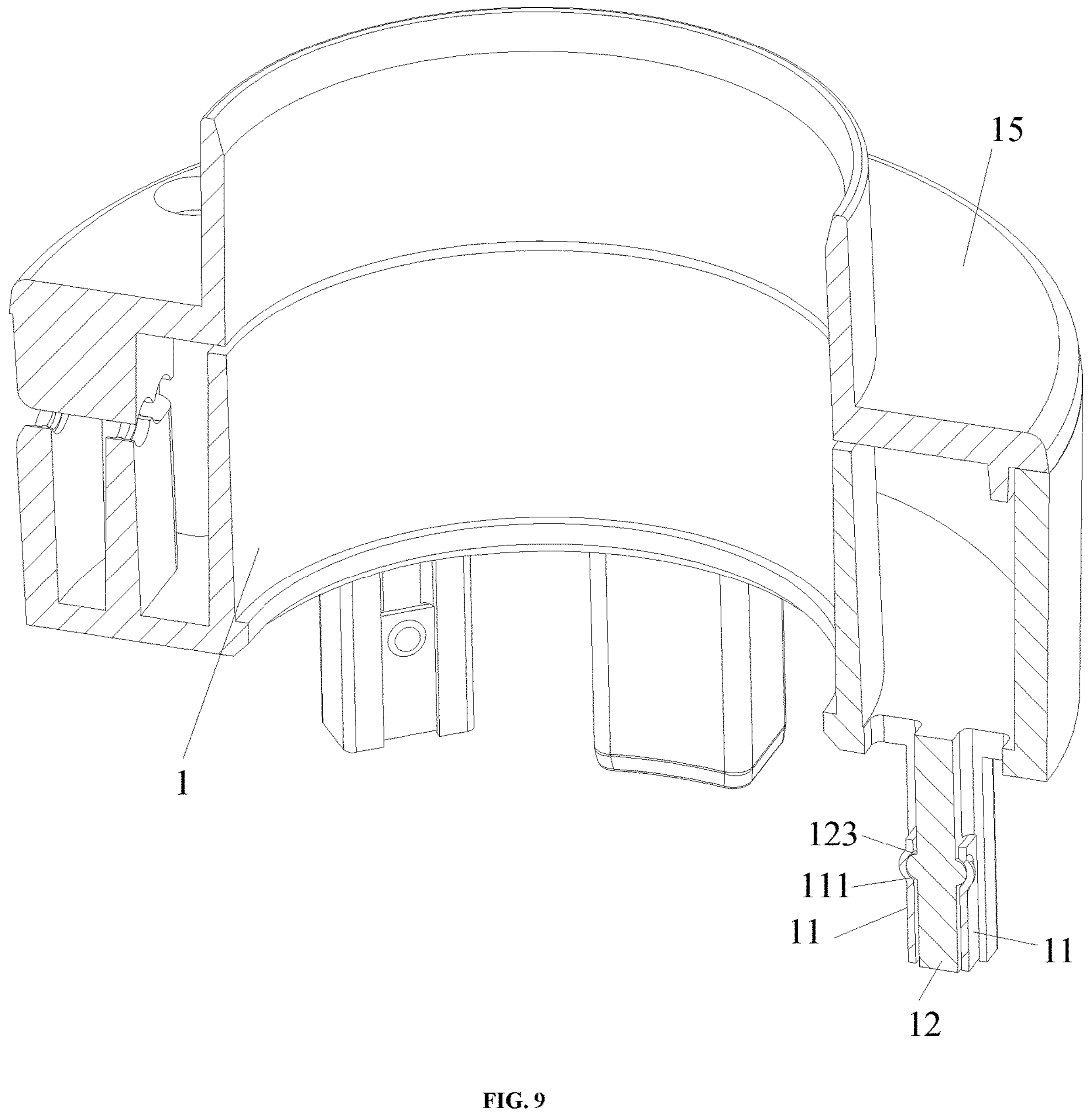
FIG. 9 shows a partial cross-sectional view of a male annular socket according to an embodiment of the present application, illustrating the structure of a plug and a first conductor.
Figure 10:
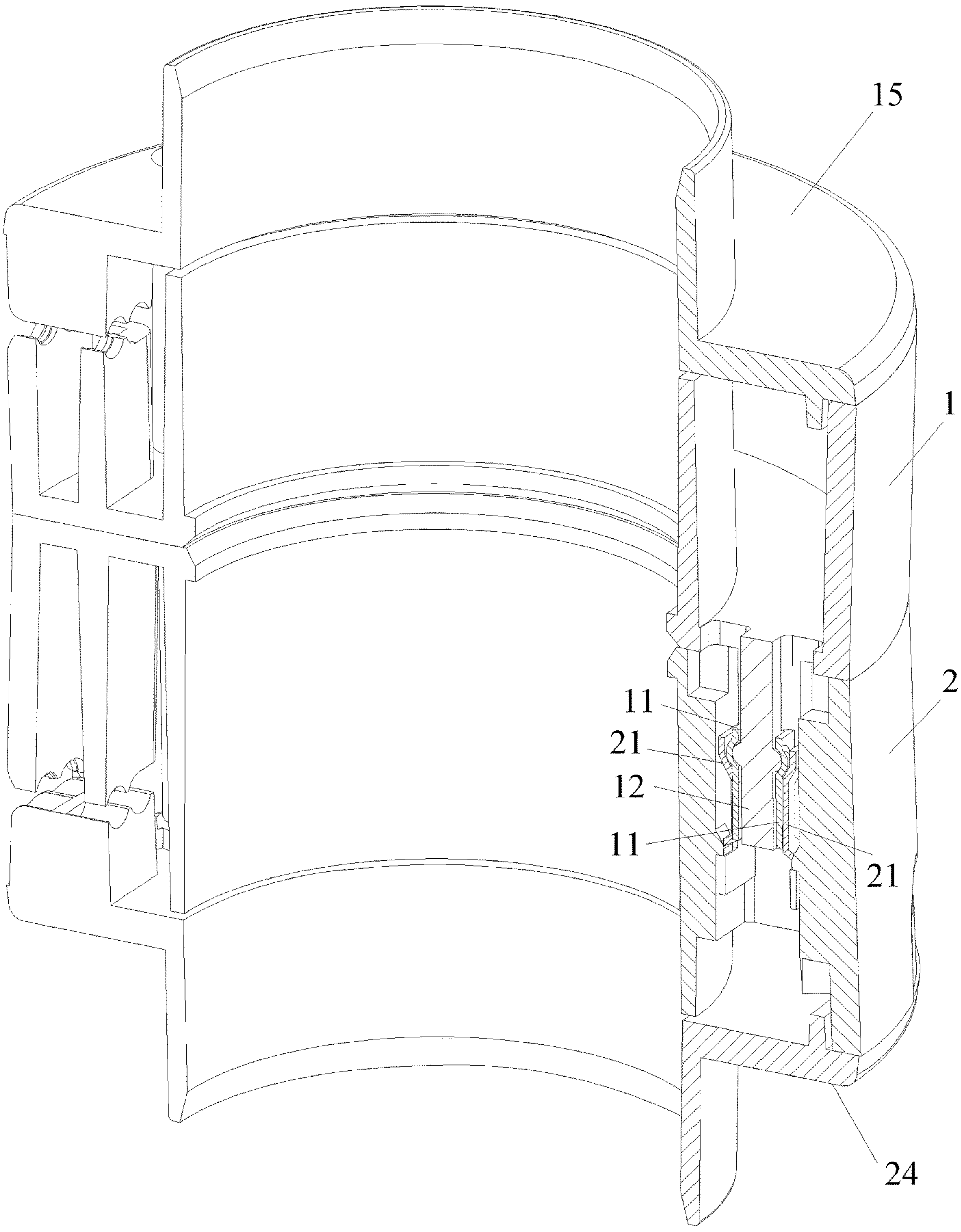
FIG. 10 shows a cross-sectional view of an electrical connector according to an embodiment of the present application, illustrating the assembled relationship of a male annular socket and a female annular socket with a first conductor and a second conductor in electrical contact.

According to this embodiment, please refer to FIGS. 1 to 10, the electrical connector comprises a male annular socket 1 with a first power cord 100 and a female annular socket 2 with a second power cord 200, the male annular socket 1 is removably inserted into and fixed to the female annular socket 2 via a plug 12 having at least a first conductor 11, which works with an inserting slot 22, the inserting slot 22 is provided with a second conductor 21 having a number corresponding to the first conductor 11, and when the plug 12 is located in the inserting slot 22, the first conductor 11 is in elastic contact with the second conductor 21 to make the male annular socket 1 electrically connect to the female annular socket 2.

Wherein, in order to make it easy to describe the electrical connector socket hereinafter, a side of the male annular socket 1 away from the female annular socket 2 is defined as the top, a side of the female annular socket 2 away from the male annular socket 1 is defined as the bottom, the direction from the top to the bottom is defined as the vertical direction and the direction perpendicular to the vertical direction is defined as the horizontal direction.

In this embodiment, the male annular socket 1 is removably fixed to the female annular socket 2 via a the plug 12 in combination with an inserting slot 22, and because the plug 22 is provided with at least one first conductor 11 and the inserting slot 22 is provided with a second conductor 22 having a number corresponding to the first conductor 11, when the male annular socket 1 is inserted and fixed to the female annular socket 2 via a the plug 12 in combination with an inserting slot 22, the first conductor 11 located in the plug 12 is in elastic contact with the second conductor 22 located in the inserting slot 22, so that the male annular socket 1 is fixed to and electrically connected to the female annular socket 2, resulting in a simple overall structure and a easy installation, and the electrical connection between the male annular socket 1 and the female annular socket 2 is effectively reinforced by the first conductor 11 that is in elastic contact with the second conductor 22, which further ensures that the electrical connection between the two is good, so as to avoid the problem that the LED light-emitting parts can not light up, resulting in subsequent difficulties in troubleshooting and solving problems.

Specifically, the plug 12 is spaced apart with two sheet-shaped first conductors 11, and the two first conductors 11 are in elastic contact with two second conductors 21 respectively when the plug 12 is located in the inserting slot 12.

Specifically, when the plug 12 is located in the inserting slot 22, the two first conductors 11 are located between the two second conductors 21, namely, the two first conductors 11 are caught in the middle of the two second conductors 21.

Specifically, the second conductor 21 comprises a sheet-shaped substrate 211 and an arch-shaped contact part 212, two sides of the contact part 212 are fixedly connected to the substrate 211, and when the plug 12 is located in the inserting slot 22, the first conductor 11 is in elastic contact with the contact part 212. The arch-shaped contact part 212 comprises a top end extending at an angle toward the male annular socket 1 and a bottom end extending at an angle away from the male annular socket 1, during the insertion of the first conductor 11 the contact part 212 is pressed by the top end of the contact part 212 which extends at an angle so that the contact part 212 as a whole deforms in a direction away from the first conductor 11 thereby making the first conductor 11 in full elastic contact with the contact part 212 after the plug 12 is fully inserted into the inserting slot 22.

Specifically, the plug 12 extending vertically is located at the bottom of the male annular socket 1, the inserting slot 22 which extends vertically and is open toward the top is located at the top of the female annular socket 2, the plug 12 is provided with a first slot 121 which is open towards the bottom and extends vertically for insertion and fixation of the first conductor 11 from bottom to top, a portion of the side surface of the plug 12 forms a side opening 122 for the contact part 212 to pass through vertically, a second slot 221 for the substrate 211 to be inserted from top to bottom and to be fixed thereto is located at the inserting slot 12, the second slot 221 is in communication with the inserting slot 22, and when the substrate 211 is inserted into the second slot 221, the contact part 212 is partially located in the inserting slot, during the insertion of the plug 12 into the inserting slot 22 the contact part 212 is pressed by the first conductor 11 to deform in a direction away from the second slot 221.

Specifically, the top of the male annular socket 1 has a first wire groove 13 for accommodating a part of the first power cord 100, a bottom surface of the first wire groove 13 has a passage 14 at a position corresponding to the first slot 121 to make the first wire groove 13 in communication with the first slot 121, an end of the first power cord 100 partly located in the first wire groove 13 is passable through the passage 14 and into the first slot 121 to be electrically connected to the first conductor 11, and a first cap 15 is provided for enclosing the first wire groove 13, the first cap 15 is fixed to the male annular socket 1 by a screw or a buckle.

Specifically, the bottom of the female annular socket 2 has a second wire groove 23 for accommodating a part of the second power cord 200, a portion of the second wire groove 23 corresponding to the bottom of the second slot 221 forms a bottom opening of the inserting slot 22 to make the second wire groove 23 in communication with the second slot 221, an end of the second power cord 200 partially disposed in the second wire groove 23 is passable through the bottom opening of the inserting slot 22 and into the second slot 221 to be electrically connected to the substrate 211, and a second cap 24 is provided for enclosing the second wire groove 23, the second cap 15 is fixed to the female annular socket 2 by a screw or a buckle.

Specifically, when the first cap 15 encloses the first wire groove 13, a fitting surface of the first cap 15 and a fitting surface of the male annular socket 1 fitting the first cap 15 form a first wire hole 16 for the first power cord 100 to pass through; when the second cap 24 encloses the second wire groove 23, and a fitting surface of the second cap 24 and a fitting surface of the female annular socket 2 fitting the second cap 24 form a second wire hole 25 for the second power cord 200 to pass through.

Specifically, the portion of the first power cord 100 located outside the electrical connector and the portion of the second power cord 200 located outside the electrical connector are connected to a connector for electrical connection with the LED light-emitting component and a connector for electrical connection with the main power source, respectively, which is prior art and will not be further described herein.

Specifically, a convex portion 123 is formed at one end of the first slot 121 toward the male annular socket 1, a concave portion 111 is formed on the first conductor 11 fitting the convex portion 123, and when the first conductor 11 is fully inserted into the first slot 121, the convex portion 123 is located in the concave portion 111 to fix the first conductor 11 and to avoid the first conductor 11 from dropping out of the first slot 121.

Specifically, two sides of the top of the first conductor 11 extend horizontally to form two hook portions 112, an elastic portion 124 is formed at a side wall of the first slot 121, a side of the hook portion 112 toward the elastic portion 124 is an inclined surface 113, and when the convex portion 123 is located in the concave portion 111, the hook portion 112 is located above the elastic portion 124 to further fix the first conductor 11 via the elastic portion 124 supporting the hook portion 112 and cooperating with the hook portion 112.

Specifically, the substrate 211 has a limiting slot 213 toward the bottom of the contact part 222, the second slot 221 has a limiting portion 222 fitting the limiting slot 213 at a position corresponding to the limiting slot 213, and when the second conductor 21 is fully inserted into the second slot 221, the limiting portion 222 is located in the limiting slot 213 to fix the second conductor 21 in the second slot 221.

Specifically, the side of the limiting portion 222 toward the top of the inserting slot 22 is an angled surface inclined toward the inserting slot 22 for guiding the second conductor 21 to be inserted into the second slot 221.

It is understandable that, in some embodiments, during the insertion of the first conductor 11 into the first slot 121, the angled surface contacts and presses the elastic portion 124 to deform the elastic portion 124 thereby making the first conductor 11 to be movable until fully inserted into the first slot 121.

Specifically, a positioning column 17 is located at the bottom of the male annular socket 1, a positioning hole 26 for the positioning column 17 to be inserted into is located at a position corresponding to the positioning column 17 at the top of the female annular socket 2, and the positioning column 17 is insertable into the inserting slot 22 and the positioning hole 26 simultaneously along with the plug 12. The number of the positioning columns 17 is one or multiple, and when the number is multiple, the multiple positioning columns 17 have different horizontal cross-sections, and multiple positioning holes 26 are one-to-one corresponding to and inserted into the positioning columns 17, respectively, so as to be convenient for distinguishing to prevent the inserting errors between the plug 12 and the inserting slots 22.

Specifically, three plugs 12 are annularly spaced apart at the bottom of the male annular socket 1, and each position of the top of the female annular socket 2, which corresponds to each the plug 12, is provided with the inserting slot 22. Three first conductors 11 respectively corresponding to the three inserting slots 12 are electrically connected one-to-one to the positive electrode of the first power cord 100, the negative electrode of the first power cord 100, and the RGB function signal line; and three second conductors 21 respectively corresponding to the three inserting slots 22 are electrically connected one-to-one to the positive electrode of the second power cord 200, the negative electrode of the second power cord 200, and the RGB function signal line.

Another embodiment provides an electrical connector.

According to this embodiment, please refer to FIGS. 1 to 10, the electrical connector comprises a male annular socket 1 and a female annular socket 2, a plug 12 with a first conductor 11 of the male annular socket 1 is mountably and dismountably inserted in an inserting slot 22 with a second conductor 21 of the female annular socket 2, and when the plug 12 is inserted in the inserting slot 22, the first conductor 11 is electrically connected to the second conductor 21, and the male annular socket 1 is fixedly connected to the female annular socket 2.

Specifically, the male annular socket 1 comprises a first power cord 100, the first power cord 100 is electrically connected to the first conductor 11, and the female annular socket 2 comprises a second power cord 200, the second power cord 200 is electrically connected to the second conductor 21.

Specifically, the first conductor 11 is located on the outer surface of the plug 12, the outer surface of the plug 12 is parallel to the direction of insertion of the plug 12, and the second conductor 21 is located on the inner surface of the inserting slot 22, the inner surface of the inserting slot 22 is parallel to the direction of insertion of the plug 12.

Specifically, the second conductor 21 comprises a sheet-shaped substrate 211 and an arch-shaped contact part 212, two ends of the contact part 212 are fixedly connected to the substrate 211, and when the plug 12 is inserted in the inserting slot 22, the first conductor 11 is in elastic contact with the contact part 212.

Specifically, the plug 12 is located at the bottom of the male annular socket 1 and extends in the direction of insertion of the plug 12, the bottom of the male annular socket 1 is a side of the male annular socket 1 toward the female annular socket 2, the inserting slot 22 is open at a top of the female annular socket 2 and extends in the direction of insertion of the plug 12, and the top of the female annular socket 2 is a side of the female annular socket 2 toward the male annular socket 1.

Specifically, the number of plugs 12 is three, the three plugs 12 are distributed annularly and spaced apart from each other at the bottom of the male annular socket 1, and the number of inserting slot 22*s* is the same as the number of plugs 12, and the inserting slot 22*s* are opposite to the plugs 12 and distributed on the top of the female annular socket 2.

Specifically, the outer surface of the plug 12 has a first slot 121 extending in the direction of insertion of the plug 12, the bottom of the first slot 121 has an opening allowing insertion of the first conductor 11, the bottom of the first slot 121 is a side of the first slot 121 toward the female annular socket 2, the first conductor 11 is fixed in the first slot 121, and a side opening 122 is formed on a portion of the outer surface of the plug 12, the side opening 122 of the plug 12 is in communication with the first slot 121 to allow the contact part 212 in elastic contact with the first conductor 11 through the side opening 122.

Specifically, the inner surface of the inserting slot 22 has a second slot 221 extending in the direction of insertion of the plug 12, the second slot 221 has an opening at the top of the second slot 221 to allow insertion of the substrate 211, the top of the second slot 221 is a side of the second slot 221 toward the male annular socket 1, the second conductor 21 is fixed in the second slot 221, the side opening 223 of the inserting slot 22 is formed on a portion of the inner surface of the inserting slot 22, and the side opening 223 of the inserting slot 22 is in communication with the second slot 221 and the inserting slot 22, respectively, to allow the contact part 212 to be partially located inside the inserting slot 22.

Specifically, a cross-section, which is cut by a plane parallel to a plane of the outer surface on which the first slot 121 is located, of the first slot 121 has a size larger than a cross-section, which is cut by a plane parallel to a plane of the outer surface on which the first slot 121 is located, of the side opening 122 so that the first conductor 11 is accommodated inside the first slot 121 and is not able to pass through the side opening 122 of the plug 12.

Specifically, a convex portion 123 is formed on the surface of the first slot 121 toward the first conductor 11, and a concave portion 111 with a shape matching the convex portion 123 is formed on the first conductor 11 corresponding to the convex portion 123, and when the plug 12 is inserted in the inserting slot 22, the convex portion 123 is located in the concave portion 111 to make the first conductor 11 be fixed in the first slot 121.

Specifically, the first slot 121 has two sidewalls, the two sidewalls are located on both sides of an inserting direction of the first conductor 11, at least one of the two sidewalls in the inserting direction of the first conductor 11 protrudes into the first slot 121 to form an elastic portion 124, and the position of the first conductor 11 corresponding to the elastic portion 124 forms a hook portion 112 so that when the plug 12 is inserted in the inserting slot 22, the hook portion 112 is located on a side of the elastic portion 124 away from the bottom of the first slot 121 to be limited by the elastic portion 124 so that the first conductor 11 is fixed in the first slot 121.

Specifically, a limiting slot 213 is located on a side of the contact portion away from the top of the second slot 221, the second slot 221 has a limiting portion 222 which corresponds to the limiting slot, protrudes toward the limiting slot 213 and is shaped to match the shape of the limiting slot, and when the plug 12 is inserted in the inserting slot 22, the limiting portion 222 is located in the limiting slot 213 to make the second conductor 21 be fixed in the second slot 221.

Specifically, the bottom of the male annular socket 1 has a positioning column 17, and the top of the female annular socket 2 has a positioning hole 26 corresponding to the positioning column 17 which allows the positioning column 17 to be inserted therein, the positioning column 17 is inserted in the positioning hole 26 for guiding the insertion of the plug 12 into the inserting slot 22.

Specifically, the top of the male annular socket 1 has a first wire groove 13 accommodating a part of the first power cord 100, the top of the male annular socket 1 is a side of the male annular socket 1 away from the female annular socket 2, a bottom wall of the first wire groove 13 has a passage 14 corresponding to the first slot 121 to communicate the first wire groove 13 and the first slot 121, an end of the first power cord 100 which is partially located in the first wire groove 13 is accessible to the first slot 121 through the passage 14 to extend into the first slot 121 and be electrically connected to the first conductor 11, and the top of the male annular socket 1 is further provided with a first cap 15 to enclose the first wire groove 13.

Specifically, the bottom of the female annular socket 2 has a second wire groove 23 accommodating a part of the second power cord 200, the bottom of the female annular socket 2 is a side of the female annular socket 2 away from the male annular socket 1, the top wall of the second wire groove 23 has an opening of the inserting slot 22 formed corresponding to the second slot 221 to communicate the second wire groove 23 and the second slot 221, and an end of the second power cord 200 which is partially located in the second wire groove 23 is accessible into the second slot 221 through the opening of the inserting slot 22 and is electrically connected to the second conductor 21, and the bottom of the female annular socket 2 is further provided with a second cap 24 to enclose the second wire groove 23.

Specifically, a fitting position between the first cap 15 and the male annular socket 1 forms a first wire hole 16 allowing the first power cord 100 to pass through, the first power cord 100 extends outside the male annular socket 1 through the first wire hole 16.

Specifically, a fitting position between the second cap 24 and the female annular socket 2 forms a second wire hole 25 allowing the second power cord 200 to pass through, the second power cord 200 extends outside the female annular socket 2 through the second wire hole 25.

Specifically, the contact part 212 comprises an end extending at an angle toward the male annular socket 1 and an end extending at an angle away from the male annular socket 1, and when the first conductor 11 is inserted in the inserting slot 22, during insertion of the first conductor 11 into the inserting slot 22, the end of the contact part 212 extending at an angle toward the male annular socket 1 is pressed by the first conductor 11 so that the contact part 212 as a whole deforms in a direction away from the first conductor 11 thereby making the first conductor 11 in full contact with the contact part 212 when the plug 12 is inserted in the inserting slot 22.

In another embodiment, an electrical connector is provided, comprising a male annular socket 1 and a female annular socket 2, a plug 12 of the male annular socket 1 is mountably and dismountably connected to an inserting slot 22 of the female annular socket 2, the male annular socket 1 has a first conductor 11 and the female annular socket 2 has a second conductor 21, and when the plug 12 is inserted in the inserting slot 22, the first conductor 11 is electrically connected to the second conductor 21, and the male annular socket 1 is fixedly connected to the female annular socket 2.

In another embodiment, an electrical connector is provided, comprising a male annular socket 1 and a female annular socket 2, a plug 12 with a first conductor 11 of the male annular socket 1 is selectively inserted in an inserting slot 22 with a second conductor 21 of the female annular socket 2, and when the plug 12 is inserted in the inserting slot 22, the first conductor 11 is in elastic contact with the second conductor 21 to make the first conductor 11 be electrically connected to the second conductor 21, and the male annular is clamped to the female annular socket 2.

The technical features of the above embodiments can be arbitrarily combined. To make the description concise, not all possible combinations of the technical features of the above embodiments have been described. However, as long as there is no contradiction in the combination of these technical features, it should be considered as the scope of the description.

The above embodiments only described several embodiments of the present invention, and the description is relatively specific and detailed, but it cannot be understood as a limitation to the scope of the present invention patent. It should be noted that for a person of ordinary skill in the art, a number of variations and improvements can be made without departing from the conception of the present invention, and these variations and improvements fall within the scope of protection of the present invention. Therefore, the scope of protection of the present invention patent shall be subject to the appended claims.

The invention claimed is:

1. An electrical connector, comprising: a male annular socket and a female annular socket, a plug with a first conductor of the male annular socket is mountably and dismountably inserted in an inserting slot with a second conductor of the female annular socket, and when the plug is inserted in the inserting slot, the first conductor is electrically connected to the second conductor, and the male annular socket is fixedly connected to the female annular socket; wherein the first conductor is located on an outer surface of the plug, the outer surface of the plug is parallel to the direction of insertion of the plug, and the second conductor is located on an inner surface of the inserting slot, the inner surface of the inserting slot is parallel to the direction of insertion of the plug.

2. The electrical connector according to claim 1, wherein the second conductor comprises a sheet-shaped substrate and an arch-shaped contact part, two ends of the contact part are fixedly connected to the substrate, and when the plug is inserted in the inserting slot, the first conductor is in elastic contact with the contact part.

3. The electrical connector according to claim 1, wherein the plug is located at the bottom of the male annular socket and extends in the direction of insertion of the plug, the bottom of the male annular socket is a side of the male annular socket toward the female annular socket, the inserting slot is open at a top of the female annular socket and extends in the direction of insertion of the plug, and the top of the female annular socket is a side of the female annular socket toward the male annular socket.

4. The electrical connector according to claim 3, wherein the number of plugs is three, the three plugs are distributed annularly and spaced apart from each other at the bottom of the male annular socket, and the number of inserting slots is the same as the number of plugs, and the inserting slots are opposite to the plugs and distributed on the top of the female annular socket.

5. The electrical connector according to claim 1, wherein the outer surface of the plug has a first slot extending in the direction of insertion of the plug, the bottom of the first slot has an opening allowing insertion of the first conductor, the bottom of the first slot is a side of the first slot toward the female annular socket, the first conductor is fixed in the first slot, and a side opening is formed on a portion of the outer surface of the plug, the side opening of the plug is in communication with the first slot to allow the contact part in elastic contact with the first conductor through the side opening.

6. The electrical connector according to claim 2, wherein the inner surface of the inserting slot has a second slot extending in the direction of insertion of the plug, the second slot has an opening at the top of the second slot to allow insertion of the substrate, the top of the second slot is a side of the second slot toward the male annular socket, the second conductor is fixed in the second slot, the side opening of the inserting slot is formed on a portion of the inner surface of the inserting slot, and the side opening of the inserting slot is in communication with the second slot and the inserting slot, respectively, to allow the contact part to be partially located inside the inserting slot.

7. The electrical connector according to claim 5, wherein a cross-section, which is cut by a plane parallel to a plane of the outer surface on which the first slot is located, of the first slot has a size larger than a cross-section, which is cut by a plane parallel to a plane of the outer surface on which the first slot is located, of the side opening so that the first conductor is accommodated inside the first slot and is not able to pass through the side opening of the plug.

8. The electrical connector according to claim 7, wherein a convex portion is formed on an inner surface of the first slot toward the first conductor, and a concave portion with a shape matching the convex portion is formed on the first conductor corresponding to the convex portion, and when the plug is inserted in the inserting slot, the convex portion is located in the concave portion to make the first conductor be fixed in the first slot.

9. The electrical connector according to claim 7, wherein the first slot has two sidewalls, the two sidewalls are located on both sides of an inserting direction of the first conductor, at least one of the two sidewalls in the inserting direction of the first conductor protrudes into the first slot to form an elastic portion, and the position of the first conductor corresponding to the elastic portion forms a hook portion so that when the plug is inserted in the inserting slot, the hook portion is located on a side of the elastic portion away from the bottom of the first slot to be limited by the elastic portion so that the first conductor is fixed in the first slot.

10. The electrical connector according to claim 6, wherein a limiting slot is located on a side of the contact portion away from the top of the second slot, the second slot has a limiting portion which corresponds to the limiting slot, protrudes toward the limiting slot and is shaped to match the shape of the limiting slot, and when the plug is inserted in the inserting slot, the limiting portion is located in the limiting slot to make the second conductor be fixed in the second slot.

11. The electrical connector according to claim 1, wherein the bottom of the male annular socket has a positioning column, and the top of the female annular socket has a positioning hole corresponding to the positioning column which allows the positioning column to be inserted therein, the positioning column is inserted in the positioning hole for guiding the insertion of the plug into the inserting slot.

12. The electrical connector according to claim 2, wherein the contact part comprises an end extending at an angle toward the male annular socket and an end extending at an angle away from the male annular socket, and when the first conductor is inserted in the inserting slot, during insertion of the first conductor into the inserting slot, the end of the contact part extending at an angle toward the male annular socket is pressed by the first conductor so that the contact part as a whole deforms in a direction away from the first conductor thereby making the first conductor in full contact with the contact part when the plug is inserted in the inserting slot.

13. An electrical connector, comprising: a male annular socket and a female annular socket, a plug of the male annular socket is mountably and dismountably connected to an inserting slot of the female annular socket, the male annular socket has a first conductor and the female annular socket has a second conductor, and when the plug is inserted in the inserting slot, the first conductor is electrically connected to the second conductor, and the male annular socket is fixedly connected to the female annular socket; wherein the first conductor is located on an outer surface of the plug, the outer surface of the plug is parallel to the direction of insertion of the plug, and the second conductor is located on an inner surface of the inserting slot, the inner surface of the inserting slot is parallel to the direction of insertion of the plug.

14. An electrical connector, comprising: a male annular socket and a female annular socket, a plug with a first conductor of the male annular socket is selectively inserted in an inserting slot with a second conductor of the female annular socket, and when the plug is inserted in the inserting slot, the first conductor is in elastic contact with the second conductor to make the first conductor be electrically connected to the second conductor, and the male annular is clamped to the female annular socket; wherein the first conductor is located on an outer surface of the plug, the outer surface of the plug is parallel to the direction of insertion of the plug, and the second conductor is located on an inner surface of the inserting slot, the inner surface of the inserting slot is parallel to the direction of insertion of the plug.

* * * * *